(12) United States Patent
Usuda et al.

(10) Patent No.: US 8,265,631 B2
(45) Date of Patent: Sep. 11, 2012

(54) MOBILE COMMUNICATION METHOD AND MOBILE STATION

(75) Inventors: Masafumi Usuda, Tokyo (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 605 days.

(21) Appl. No.: 11/667,914

(22) PCT Filed: Nov. 18, 2005

(86) PCT No.: PCT/JP2005/021293
§ 371 (c)(1),
(2), (4) Date: Nov. 1, 2007

(87) PCT Pub. No.: WO2006/054721
PCT Pub. Date: May 26, 2006

(65) Prior Publication Data
US 2008/0119193 A1 May 22, 2008

(30) Foreign Application Priority Data
Nov. 19, 2004 (JP) ................. P2004-336475

(51) Int. Cl.
*H04W 36/00* (2009.01)
(52) U.S. Cl. .............. 455/442; 455/561; 455/522
(58) Field of Classification Search .............. 370/229, 370/232, 233, 328–335, 395.4, 278, 231; 455/522, 69, 512, 513, 39
See application file for complete search history.

(56) References Cited

U.S. PATENT DOCUMENTS
4,479,215 A * 10/1984 Baker ...................... 714/749
(Continued)

FOREIGN PATENT DOCUMENTS
CN 1267410 A 9/2000
(Continued)

OTHER PUBLICATIONS

"3rd Generation Partnership Project; Technical Specification Group Radio Access Network; Physical channels and mapping of transport channels onto physical channels (FDD) (Release 1999)", 3GPP TS 25.211 V3.12.0 (Sep. 2002); pp. 9 to12.

(Continued)

*Primary Examiner* — Jean Gelin
*Assistant Examiner* — Chuong A Ngo
(74) *Attorney, Agent, or Firm* — Marvin A. Motsenbocker; MOTS Law, PLLC

(57) ABSTRACT

A mobile communication method according to the present invention includes: transmitting, from a mobile station, a retransmission-control applied dedicated physical data channel to which a retransmission control processing is applied and which is configured not to contain any transmission data blocks, when there is no transmission data block that should be transmitted, at a predetermined cycle, with a transmission power having a predetermined offset relative to a transmission power of a dedicated physical control channel; generating, by a radio base station, transmission power control information for controlling a transmission power of the dedicated physical control channel, by a closed-loop power control based on a reception quality of the dedicated physical control channel, and by an outer-loop power control based on a reception quality of the retransmission-control applied dedicated physical data channel, and transmitting the transmission power control information to the mobile station; and determining, by the mobile station, the transmission power of the dedicated physical control channel, based on the transmission power control information, and transmitting, from the mobile station, the dedicated physical control channel to which the re-transmission control processing is not applied with the determined transmission power.

7 Claims, 7 Drawing Sheets

U.S. PATENT DOCUMENTS

| | | | |
|---|---|---|---|
| 5,881,069 A * | 3/1999 | Cannon et al. | 714/748 |
| 5,896,402 A * | 4/1999 | Kurobe et al. | 714/748 |
| 5,923,662 A * | 7/1999 | Stirling et al. | 370/432 |
| 6,173,162 B1 * | 1/2001 | Dahlman et al. | 455/69 |
| 6,392,993 B1 * | 5/2002 | Hamilton et al. | 370/230 |
| 2002/0077141 A1 * | 6/2002 | Hwang et al. | 455/522 |
| 2002/0089927 A1 * | 7/2002 | Fischer et al. | 370/229 |
| 2002/0136193 A1 * | 9/2002 | Chang et al. | 370/347 |
| 2003/0142657 A1 * | 7/2003 | Forssell | 370/347 |
| 2003/0174675 A1 * | 9/2003 | Willenegger et al. | 370/335 |
| 2003/0207696 A1 * | 11/2003 | Willenegger et al. | 455/522 |
| 2004/0193971 A1 | 9/2004 | Soong et al. | |
| 2005/0013247 A1 * | 1/2005 | Sipola et al. | 370/230 |
| 2005/0030964 A1 * | 2/2005 | Tiedemann et al. | 370/431 |
| 2005/0032551 A1 * | 2/2005 | Lee et al. | 455/560 |
| 2005/0041626 A1 * | 2/2005 | Tiirola et al. | 370/335 |
| 2005/0117551 A1 * | 6/2005 | Han et al. | 370/335 |
| 2005/0117559 A1 * | 6/2005 | Malladi et al. | 370/342 |
| 2005/0277419 A1 | 12/2005 | Takano et al. | |

FOREIGN PATENT DOCUMENTS

| | | |
|---|---|---|
| JP | 08-237735 | 9/1996 |
| WO | 03/084274 A1 | 10/2003 |

OTHER PUBLICATIONS

"3rd Generation Partnership Project; Technical Specification Group Radio Access Network; Physical Layer procedures (FDD) (Release 1999)", 3GPP TS 25.214 V3.12.0 (Mar. 2003); pp. 7 to19.

"3rd Generation Partnership Project; Technical Specification Group Radio Access Network; Feasibility Study for Enhanced Uplink for UTRA FDD (Release 6)", 3GPP TR 25.896 V6.0.0 (Mar. 2004); pp. 1 to 179.

3GPP TS 25.211 V6.2.0 (Sep. 2004), 3rd Generation Partnership Project; Technical Specification Group Radio Access Network; Physical channels and mapping of transport channels onto physical channels (FDD) (Release 6), 51 pages.

3GPP Organizational Partner, 3rd Generation Partnership Project; Technical Specification Group Radio Accesss Network; Physical layer procedures (FDD) (release 1999), 3GPP TS 25.214 V3.12.0, pp. 12-20. (Mar. 2003).

Siemens, Text Proposal for Support of Hybrid ARQ Type II/III in the Physical Layer, TSG-RAN Working Group 1 meeting #4, 3GPP TSGR#4 (99) 356, pp. 1-7. (Apr. 1999).

Extended European search report issued on Apr. 19, 2012 in a counterpart European patent application.

* cited by examiner

| TRANSMISSION FORMAT NUMBER | TRANSMISSION DATA BLOCK SIZE (bytes) | NUMBER OF RETRANSMISSIONS |
|---|---|---|
| 0 | 0 | 0 |
| 1 | 100 | 1 |
| 2 | 200 | 2 |
| 3 | 300 | 3 |
| 4 | 400 | 4 |
| 5 | 500 | 5 |
| 6 | 600 | 6 |
| 7 | 700 | 7 |
| 8 | 800 | 8 |
| 9 | 900 | 9 |
| ⋮ | ⋮ | ⋮ |

MOBILE COMMUNICATION METHOD AND MOBILE STATION

TECHNICAL FIELD

The present invention relates to a mobile communication method for transmitting a transmission data block from a mobile station to a radio base station, and also relates to a mobile station used in the mobile communication method.

BACKGROUND ART

In recent years, a mobile communication system to which "EUL (Enhanced Uplink)" is applied in a radio uplink has been studied in the 3GPP.

As shown in FIG. 1, in the mobile communication system, an enhanced dedicated physical data channel (E-DPDCH), an enhanced dedicated physical control channel (E-DPCCH), a dedicated physical data channel (DPDCH), and a dedicated physical control channel (DPCCH) are transmitted in an uplink.

Here, the hybrid ARQ (Auto Repeat reQuest), which is a kind of retransmission control processings, is applied to the enhanced dedicated physical data channel (E-DPDCH).

In the mobile communication system, a mobile station UE is configured to constantly transmit the dedicated physical data channel (DPDCH) and the dedicated physical control channel (DPCCH) at a predetermined cycle.

In other words, the mobile station UE is configured to transmit the dedicated physical data channel (DPDCH) in a transmission format (in which a transmission data block size is "0") containing a control header and a CRC error detection code (for example, 10 bits, 12 bits, 16 bits, 24 bits or the like) only, when there is no transmission data block that should be transmitted.

On the other hand, the mobile station UE is configured to intermittently transmit the enhanced dedicated physical data channel (E-DPDCH) and the enhanced dedicated physical control channel (E-DPCCH) only when there is transmission data block that should be transmitted.

Additionally, a radio base station Node B is configured to determine transmission power control information (a TPC command) and to notify the mobile station UE of the transmission power control information. Here, the transmission power control information is used for controlling the transmission power of a dedicated physical control channel (DPCCH) in the mobile station UE, so that a reception quality of the dedicated physical control channel (DPCCH) can satisfy a target SIR by a closed-loop power control based on a reception power of the dedicated physical control channel (DPCCH) constantly transmitted from the mobile station UE.

Furthermore, the radio base station Node B is configured to adjust the abovementioned target SIR of the dedicated physical control channel (DPCCH) by an outer-loop power control based on a reception power of a dedicated physical data channel (DPDCH) constantly transmitted from the mobile station UE.

Note that the mobile station UE is configured: to transmit the enhanced dedicated physical data channel (E-DPDCH) with a transmission power having an E-DPDCH offset relative to a transmission power of the dedicated physical control channel (DPCCH); to transmit the enhanced dedicated physical control channel (E-DPCCH) with a transmission power having an E-DPCCH offset relative to a transmission power of the dedicated physical control channel (DPCCH); and to transmit the dedicated physical data channel (DPDCH) with a transmission power having a DPDCH offset relative to a transmission power of the dedicated physical control channel (DPCCH).

However, the conventional mobile communication system as described above has a problem of requiring an unnecessary equipment cost, because, even in a case where the mobile station UE transmits all of transmission data blocks by using the enhanced dedicated physical data channel (E-DPDCH), a function (for example, a dedicated physical data channel (DPDCH) despreader, or the like) of receiving the dedicated physical data channel (DPDCH) should be provided in the radio base station Node B, in order to stabilize a communication quality when there is no transmission data block that should be transmitted.

[Non-patent Document 1] "W-CDMA Mobile Communication Systems", edited by Keiji Tachikawa (Maruzen Co., Ltd.)

[Non-patent Document 2] 3GPP TR25.896 v6.0.0

DISCLOSURE OF THE INVENTION

Consequently, the present invention has been made in consideration of the above point, and an object thereof is to provide, in a mobile communication system to which the Enhanced Uplink is applied, a mobile communication method and a mobile station which are capable of facilitating a reduction in equipment cost while facilitating stabilization of communication quality.

A first aspect of the present invention is summarized as a mobile communication method for transmitting a transmission data block from a mobile station to a radio base station, including the steps of: transmitting, from the mobile station, a dedicated physical control channel to which a retransmission control processing is not applied, at a predetermined cycle, with a transmission power determined based on transmission power control information received from the radio base station; transmitting, from the mobile station, a retransmission-control applied dedicated physical data channel to which a retransmission control processing is applied, at a predetermined cycle, with a transmission power having a predetermined offset relative to a transmission power of the dedicated physical control channel; transmitting, from the mobile station, the retransmission-control applied dedicated physical data channel configured not to contain any transmission data blocks, when there is no transmission data block that should be transmitted; generating, by the radio base station, transmission power control information for controlling a transmission power of the dedicated physical control channel, by a closed-loop power control based on a reception quality of the dedicated physical control channel, and by an outer-loop power control based on a reception quality of the retransmission-control applied dedicated physical data channel, and transmitting the transmission power control information to the mobile station; and determining, by the mobile station, the transmission power of the dedicated physical control channel, based on the transmission power control information.

In the first aspect of the present invention, the retransmission-control applied dedicated physical data channel, which is configured not to contain any transmission data blocks, can contain a control header and an error detection code.

In the first aspect of the present invention, the mobile station does not have to retransmit the retransmission-control applied dedicated physical control channel configured not to contain any transmission data blocks.

A second aspect of the present invention is summarized as a mobile station which transmits a transmission data block to a radio base station, including: a dedicated physical control channel transmitter unit configured to transmit a dedicated physical control channel to which a retransmission control processing is not applied, at a predetermined cycle, with a transmission power determined based on transmission power control information received from the radio base station; a retransmission-control applied dedicated physical data channel transmitter unit configured to transmit a retransmission-control applied dedicated physical data channel to which a retransmission control processing is applied, at a predetermined cycle, with a transmission power having a predetermined offset relative to the transmission power of the dedicated physical control channel, and to transmit, the retransmission-control applied dedicated physical data channel configured not to contain any transmission data blocks, when there is no transmission data block that should be transmitted; and a transmission power controller unit configured to determine a transmission power of the dedicated physical control channel based on the transmission power control information transmitted from the radio base station.

In the second aspect of the present invention, the retransmission-control applied dedicated physical data channel, which is configured not to contain any transmission data blocks, can be configured to contain a control header and an error detection code.

In the second aspect of the present invention, the retransmission-control applied dedicated physical data channel transmitter unit can be configured not to retransmit the retransmission-control applied dedicated physical data channel configured not to contain any transmission data blocks.

BEST MODE FOR CARRYING OUT THE INVENTION

Figure 1:
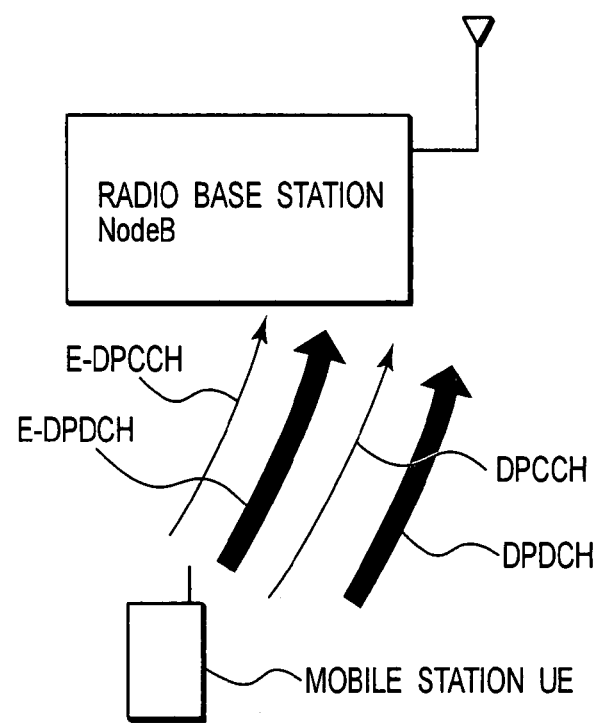
[FIG. 1] is an illustration showing a topology of uplink radio channels between a radio base station and a mobile station in a conventional mobile communication system.
Figure 2:
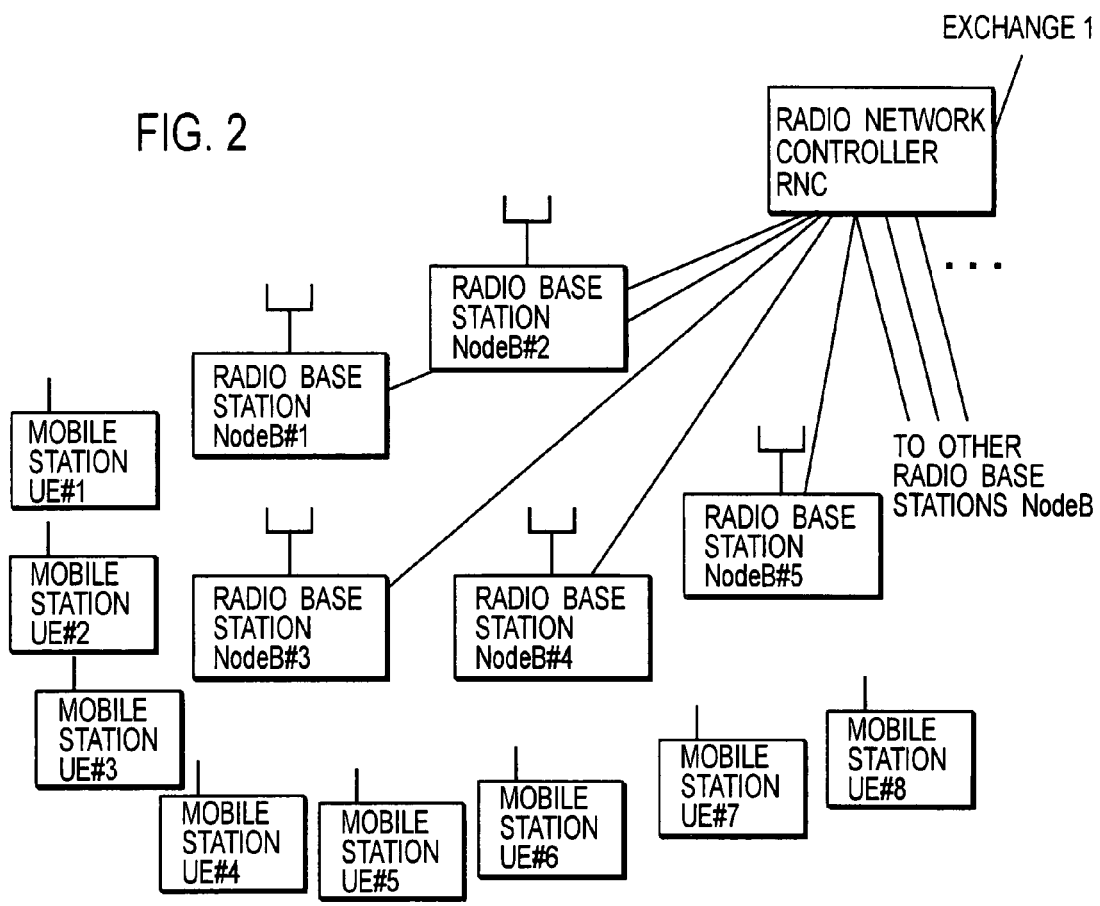
[FIG. 2] is an entire configuration diagram of a mobile communication system according to an embodiment of the present invention.

Configuration of Mobile Communication System According to First Embodiment of the Present Invention A configuration of a mobile communication system according to a first embodiment of the present invention will be described with reference to FIGS. 2 to 7. As shown in FIG. 2, the mobile communication system according to this embodiment includes a plurality of mobile stations UE #1 to #8, a plurality of radio base stations Node B #1 to #5, and a radio network controller RNC.

Figure 3:
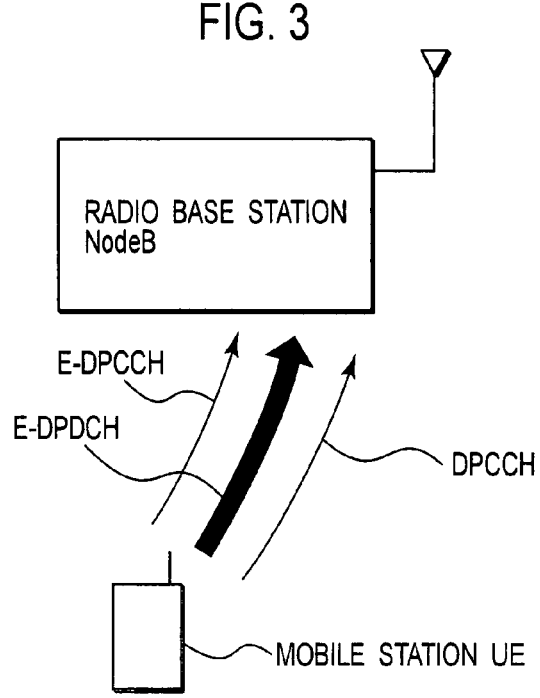
[FIG. 3] is an illustration showing a topology of uplink radio channels between a radio base station and a mobile station in the mobile communication system according to an embodiment of the present invention.

As shown in FIG. 3, in the mobile communication system according this embodiment, an enhanced dedicated physical data channel (E-DPDCH), an enhanced dedicated physical control channel (E-DPCCH), and a dedicated physical control channel (DPCCH) are transmitted in an uplink. In other words, in the mobile communication system according this embodiment, a dedicated physical data channel (DPDCH) is not transmitted in an uplink.

Here, the hybrid ARQ (Auto Repeat reQuest, hereinafter referred to as HARQ), which is a kind of retransmission control processings, has been applied to the enhanced dedicated physical data channel (E-DPDCH).

More specifically, in the mobile communication system according to this embodiment, the mobile station UE is configured to retransmit the enhanced dedicated physical data channel (E-DPDCH), based on a transmission acknowledgement signal (Ack or Nack) transmitted from the radio base station.

Moreover, the mobile station UE according to this embodiment is configured to transmit all of transmission data blocks through the enhanced dedicated physical data channel (E-DPDCH). In other words, the mobile station UE according to this embodiment is configured not to transmit transmission data blocks by using the dedicated physical data channel (DPDCH).

Figures 4, 5:
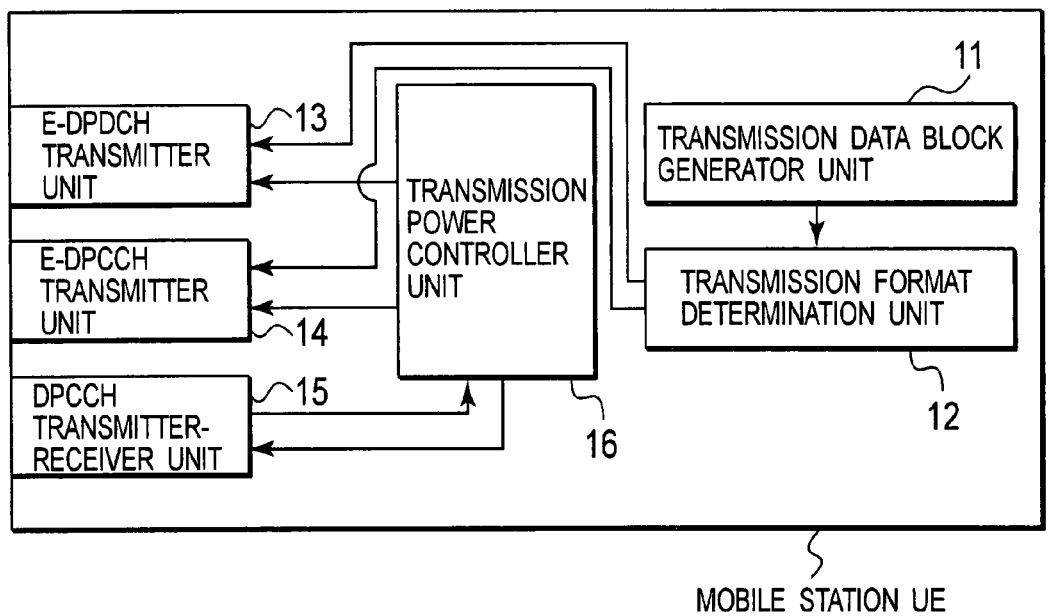
[FIG. 4] is a functional block diagram of the mobile station in the mobile communication system according to the one embodiment of the present invention.
[FIG. 5] is a diagram showing an example of a table retained by a transmission format determination unit of the mobile station in the mobile communication system according to an embodiment of the present invention.

As shown in FIG. 4, the mobile station UE according to this embodiment includes a transmission data block generator unit 11, a transmission format determination unit 12, an E-DPDCH transmitter unit 13, an E-DPCCH transmitter unit 14, a DPCCH transmitter unit 15, and a transmission power controller unit 16.

The transmission data block generator unit 11 is configured to generate a transmission data block that should be transmitted, based on an instruction from a user of the mobile station UE, or the like.

The transmission format determination unit 12 is configured to determine a transmission format of the enhanced dedicated physical data channel (E-DPDCH) which transmits the transmission data block generated by the transmission data block generator unit 11.

When there is no transmission data block that should be transmitted, the transmission format determination unit 12 determines a transmission format (in which a transmission data block size is "0") containing no transmission data block, as the transmission format of the enhanced dedicated physical data channel (E-DPDCH).

This transmission format is composed only of a control header and an error detection codes (for example, a CRC error detection code of 10 bits, 12 bits, 16 bits, 24 bits or the like). Additionally, the number of retransmissions is set to "0" in this transmission format. Note that this transmission format may be composed so as not to include any control header.

For example, by using a table as shown in FIG. 5, the transmission format determination unit 12 determines the transmission format of the enhanced dedicated physical data channel (E-DPDCH) which transmits a transmission data block.

Here, when there is no transmission data block that should be transmitted, the transmission format determination unit 12 determines the transmission format of the enhanced dedicated physical data channel (E-DPDCH) which transmits a transmission data block by setting a transmission data block size to "0".

Note that the transmission format determination unit 12 is configured to determine a transmission data block size, based on a transmission rate control processing by Enhanced Uplink.

The E-DPDCH transmitter unit 13 is configured to transmit, to the radio base station Node B, the enhanced dedicated physical data channel (E-DPDCH) in the transmission format determined by the transmission format determination unit 12. Note that the enhanced dedicated physical data channel (E-DPDCH) is a retransmission-control applied enhanced dedicated physical data channel to which a retransmission control processing such as HARQ or the like has been applied.

Additionally, the E-DPDCH transmitter unit 13 is configured to constantly transmit the enhanced dedicated physical data channel (E-DPDCH) at a predetermined cycle.

Furthermore, the E-DPDCH transmitter unit 13 is configured not to retransmit the enhanced dedicated physical data channel (E-DPDCH) composed so as not to contain a transmission data block, that is, the enhanced dedicated physical data channel (E-DPDCH) in the transmission format having a transmission data block size set to "0".

Still furthermore, the E-DPDCH transmitter unit 13 is configured to transmit the enhanced dedicated physical data channel (E-DPDCH) with a transmission power having an E-DPDCH offset relative to a transmission power of the dedicated physical control channel (DPCCH).

The E-DPCCH transmitter unit 14 is configured to transmit, to the radio base station Node B, the enhanced dedicated physical control channel (E-DPCCH) containing a transmission format number used for specifying the transmission format determined by the transmission format determination unit 12, the number of retransmissions of the enhanced dedicated physical data channel (E-DPDCH) and the like.

In addition, the E-DPCCH transmitter unit 14 is configured to constantly transmit the enhanced dedicated physical control channel (E-DPCCH) at a predetermined cycle.

Moreover, the E-DPCCH transmitter unit 14 is configured to transmit the enhanced dedicated physical control channel (E-DPCCH) with a transmission power having an E-DPCCH offset relative to a transmission power of the dedicated physical control channel (DPCCH).

Figure 6:
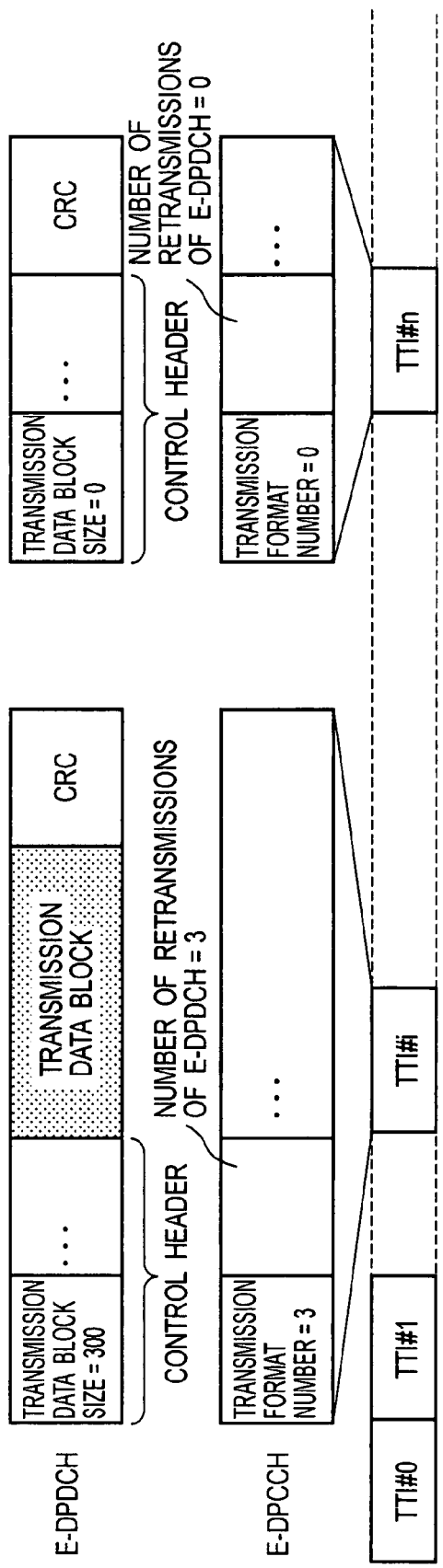
[FIG. 6] is a diagram showing transmission formats of an enhanced dedicated physical data channel (E-DPDCH) transmitted by the mobile station in the mobile communication system according to an embodiment of the present invention.

Here, with reference to FIG. 6, examples are given for a transmission format used when the E-DPDCH transmitter unit 13 transmits the enhanced dedicated physical data channel (E-DPDCH), and a transmission format used when the E-DPCCH transmitter unit 14 transmits the enhanced dedicated physical control channel (E-DPCCH).

As shown in FIG. 6, the enhanced dedicated physical data channel (E-DPDCH) and the enhanced dedicated physical control channel (E-DPCCH) are transmitted at a predetermined cycle (for example, TTI, that is, transmit time interval).

For example, when there is a transmission data block that should be transmitted (in the case of TTI #1 in FIG. 6), the enhanced dedicated physical data channel (E-DPDCH) is composed of a control header, a transmission data block, and an error detection code (for example, a CRC error detection code). A transmission data block size (for example, "300") is set in the control header.

Additionally, a transmission format number (for example, "3") determined by the transmission format determination unit 12 and the number of retransmissions (for example, "3") of the E-DPDCH are set in the enhanced dedicated physical control channel (E-DPCCH).

On the other hand, when there is no transmission data block that should be transmitted (in the case of TTI #n in FIG. 6), the enhanced dedicated physical data channel (E-DPDCH) is composed only of a control header and an error detection code (for example, a CRC error detection code). Because there is no transmission data, a transmission data block size "0" is set in the control header. In this case, it is not necessary that any control header be added.

Furthermore, a transmission format number "0" determined by the transmission format determination unit 12 and the number "0" of retransmissions of the E-DPDCH are set in the enhanced dedicated physical control channel (E-DPCCH).

The DPCCH transmitter-receiver unit 15 is configured to constantly transmit and receive the dedicated physical control channel (DPCCH) to and from the radio base station Node B at a predetermined cycle. Note that a retransmission control processing such as HARQ has not been applied to the dedicated physical control channel (DPCCH).

Note that the dedicated physical control channel (DPCCH) transmits: a pilot symbol used in the RAKE combining, the SIR measurement or the like; a TFCI (Transport Format Combination Indicator) used for discriminating a transmission format of the dedicated physical data channel (DPDCH) in an uplink; transmission power control information (a TPC command) for a downlink; and the like.

Moreover, the dedicated physical control channel (DPCCH) receives transmission power control information (a TPC command) for an uplink, the transmission power control information being transmitted from the radio base station Node B.

The DPCCH transmitter-receiver unit 15 is configured to transmit, at a predetermined cycle, the dedicated physical control channel (DPCCH) with a transmission power determined based on the transmission power control information (the TPC command) transmitted from the radio base station Node B.

The transmission power controller unit 16 is configured to determine a transmission power of the dedicated physical control channel (DPCCH), based on the transmission power control information (the TPC command) transmitted from the radio base station Node B.

Additionally, the transmission power controller unit 16 is configured to control a transmission power of the enhanced dedicated physical data channel (E-DPDCH) or of the enhanced dedicated physical control channel (E-DPCCH), based on the above described E-DPDCH offset and E-DPCCH offset.

Figure 7:
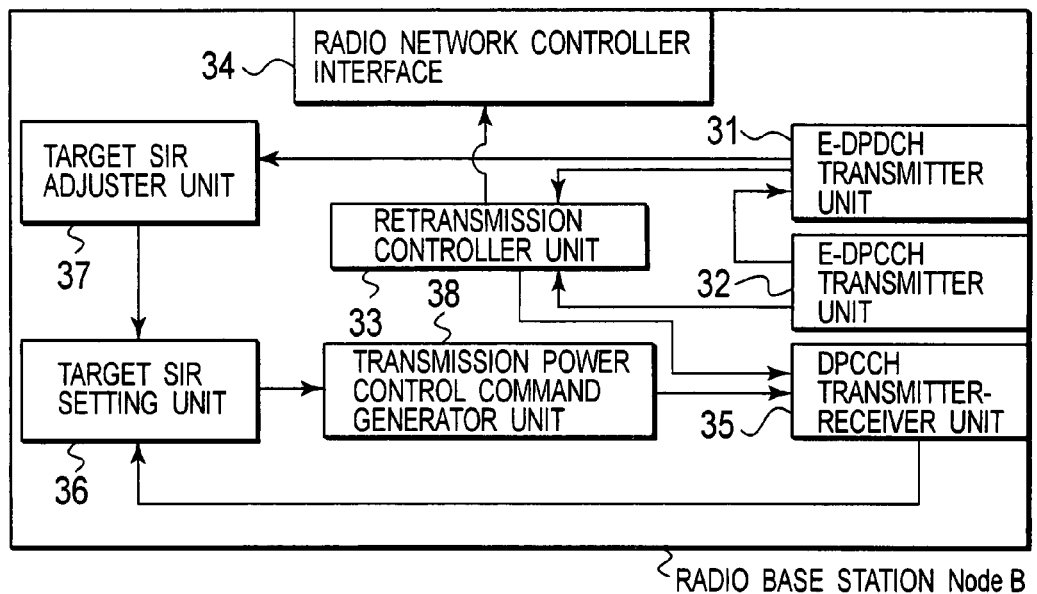
[FIG. 7] is a functional block diagram of the radio base station in the mobile communication system according to an embodiment of the present invention.

As shown in FIG. 7, the radio base station Node B according to this embodiment includes an E-DPDCH receiver unit 31, an E-DPCCH receiver unit 32, a retransmission controller unit 33, a radio network controller interface 34, a DPCCH transmitter-receiver unit 35, and a target SIR setting unit 36, a target SIR adjuster unit 37, and a transmission power control command generator unit 38.

The E-DPDCH receiver unit 31 is configured to perform a reception processing (such as a RAKE combining or a despreading processing) on the enhanced dedicated physical data channel (E-DPDCH) constantly transmitted from the mobile station UE.

The E-DPCCH receiver unit 32 is configured to perform a reception processing (such as a RAKE combining or a despreading processing) on the enhanced dedicated physical control channel (E-DPCCH) constantly transmitted from the mobile stations UE.

The retransmission controller unit 33 is configured to perform a retransmission control processing (for example, the HARQ) on the enhanced dedicated physical data channel (E-DPDCH), based on a result (OK or NG) of the reception processing performed by the E-DPDCH receiver unit 31 on the enhanced dedicated physical data channel (E-DPDCH), and the number of retransmissions and the like obtained by the E-DPCCH receiver unit 32.

The retransmission controller unit 33 is configured to transmit a transmission acknowledgement signal (Ack) to the mobile station UE via the DPCCH transmitter-receiver unit 35, and, to transmit, to the radio network controller RNC via the radio network controller interface 34, a transmission data block contained in the enhanced dedicated physical data channel (E-DPDCH), when the result of the reception processing on the enhanced dedicated physical data channel (E-DPDCH) is OK.

The retransmission controller unit 33 is configured to transmit a transmission acknowledgement signal (Nack) via the DPCCH transmitter-receiver unit 35, when the result of the reception processing on the enhanced dedicated physical data channel (E-DPDCH) is NG.

The radio network controller interface 34 is configured to function as an interface with the radio network controller RNC.

The DPCCH transmitter-receiver unit 35 is configured to transmit, to the mobile station UE, the dedicated physical control channel (DPCCH) containing the transmission acknowledgement signal (Ack or Nack) from the retransmission controller unit 33, a TPC command (transmission power control information) from the transmission power control command generator unit; a pilot symbol, and the like.

The target SIR setting unit 36 is configured to control a transmission power of the dedicated physical control channel (DPCCH) transmitted from the mobile station UE, by a closed-loop power control based on a reception quality (a reception power) of the dedicated physical control channel (DPCCH) constantly transmitted from the mobile station UE.

Specifically, the target SIR setting unit 36 is configured to measure an SIR (Signal to Interface Ratio) of the dedicated physical control channel (DPCCH) received by the DPCCH transmitter-receiver unit 35, and to compare the measured SIR and a target SIR with each other.

The target SIR adjuster unit 37 is configured to adjust the target SIR of the dedicated physical control channel (DPCCH) through an outer-loop power control based on a reception quality (a reception power) of the enhanced dedicated physical data channel (E-DPDCH).

The transmission power control command generator unit 38 is configured to generate transmission power control information (a TPC command) used for controlling a transmission power of the dedicated physical control channel (DPCCH) in the mobile station UE, so that the target SIR of the dedicated physical control channel (DPCCH) set by the target SIR adjuster unit 37 can be satisfied.

Specifically, the transmission power control command generator unit 38 is configured to generate the transmission power control information (the TPC command) notifying "up" or "down" of a transmission power of the dedicated physical control channel (DPCCH) in the mobile station UE, based on a comparison result between the measured SIR and the target SIR made by the target SIR setting unit 36.

Figure 8:
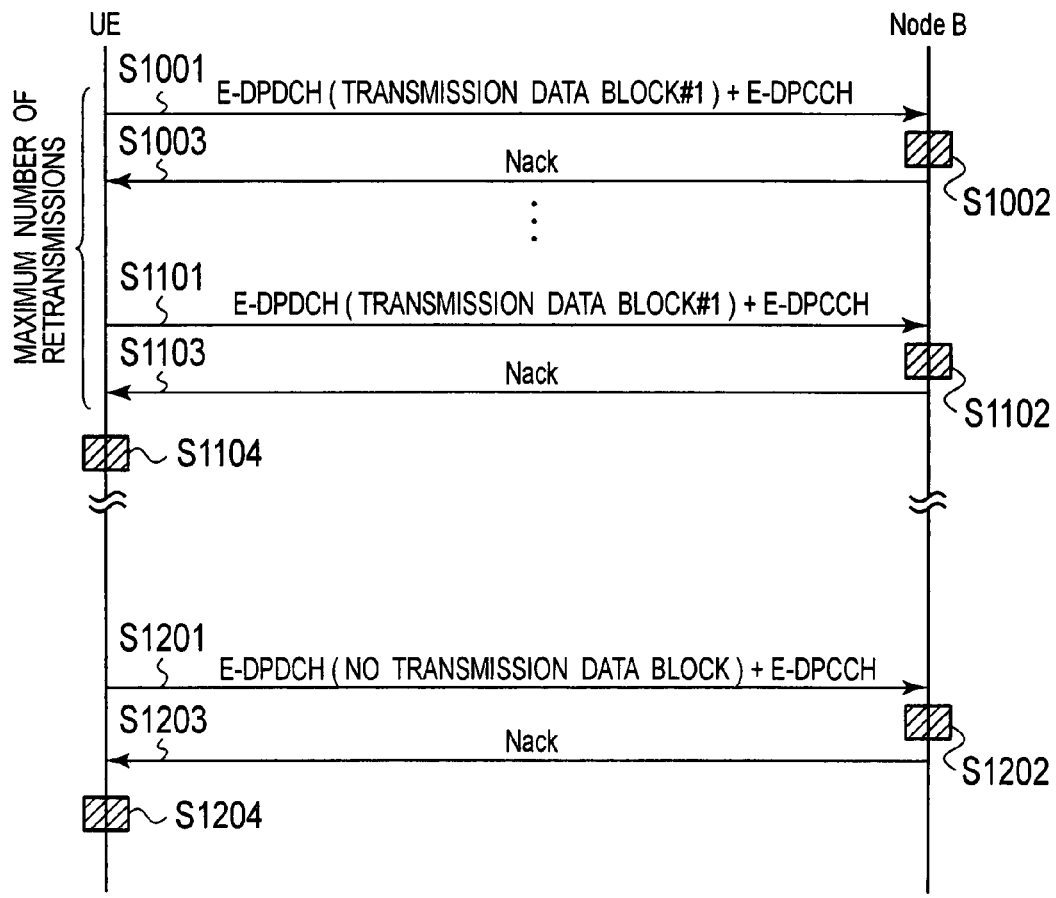
[FIG. 8] is a sequence diagram showing operations of the radio base station in the mobile communication system according to an embodiment of the present invention.

Operations of Mobile Communication System According to First Embodiment of the Present Invention Operations of the mobile communication system according to the first embodiment of the present invention will be described with reference to FIG. 8.

In step S1001, the mobile station UE transmits the enhanced dedicated physical data channel (E-DPDCH) containing a transmission data block #1, and the enhanced dedicated physical control channel (E-DPCCH).

When the radio base station Node B has failed in a reception processing on the enhanced dedicated physical data channel (E-DPDCH) containing the transmission data block #1 in step 1002, the radio base station Node B transmits, in step S1003, to the mobile station UE, a transmission acknowledgment signal (Nack) indicating that effect.

Thereafter, the mobile station UE retransmits the enhanced dedicated physical data channel (E-DPDCH) containing the transmission data block #1, and the enhanced dedicated physical control channel (E-DPCCH), for the maximum number of retransmissions set based on a transmission data block size of the transmission data block #1 (refer to steps S1101 to S1103).

In step S1104, the mobile station UE judges that the enhanced dedicated physical data channel (E-DPDCH) containing the transmission data block #1, and the enhanced dedicated physical control channel (E-DPCCH) have been transmitted for the maximum number of retransmissions, and thereby ends a retransmission processing.

Additionally, in step S1201, the mobile station UE transmits the enhanced dedicated physical data channel (E-DPDCH) in the transmission format containing no transmission data block, and the enhanced dedicated physical control channel (E-DPCCH).

When the radio base station Node B has failed in step 1202 in a reception processing on the enhanced dedicated physical data channel (E-DPDCH) in the transmission format containing no transmission data block, the radio base station Node B transmits, in step S1203, to the mobile station UE, a transmission acknowledgment signal (Nack) indicating that effect.

In step S1204, because the number of retransmissions is set to "0" in the transmission format containing no transmission data block, the mobile station UE does not retransmit the enhanced dedicated physical data channel (E-DPDCH) and the enhanced dedicated physical control channel (E-DPCCH).

Next, with reference to FIG. 9, operations in which the base station Node B forming the mobile communication system according to the first embodiment of the present invention performs a closed-loop power control will be described.

Figure 9:
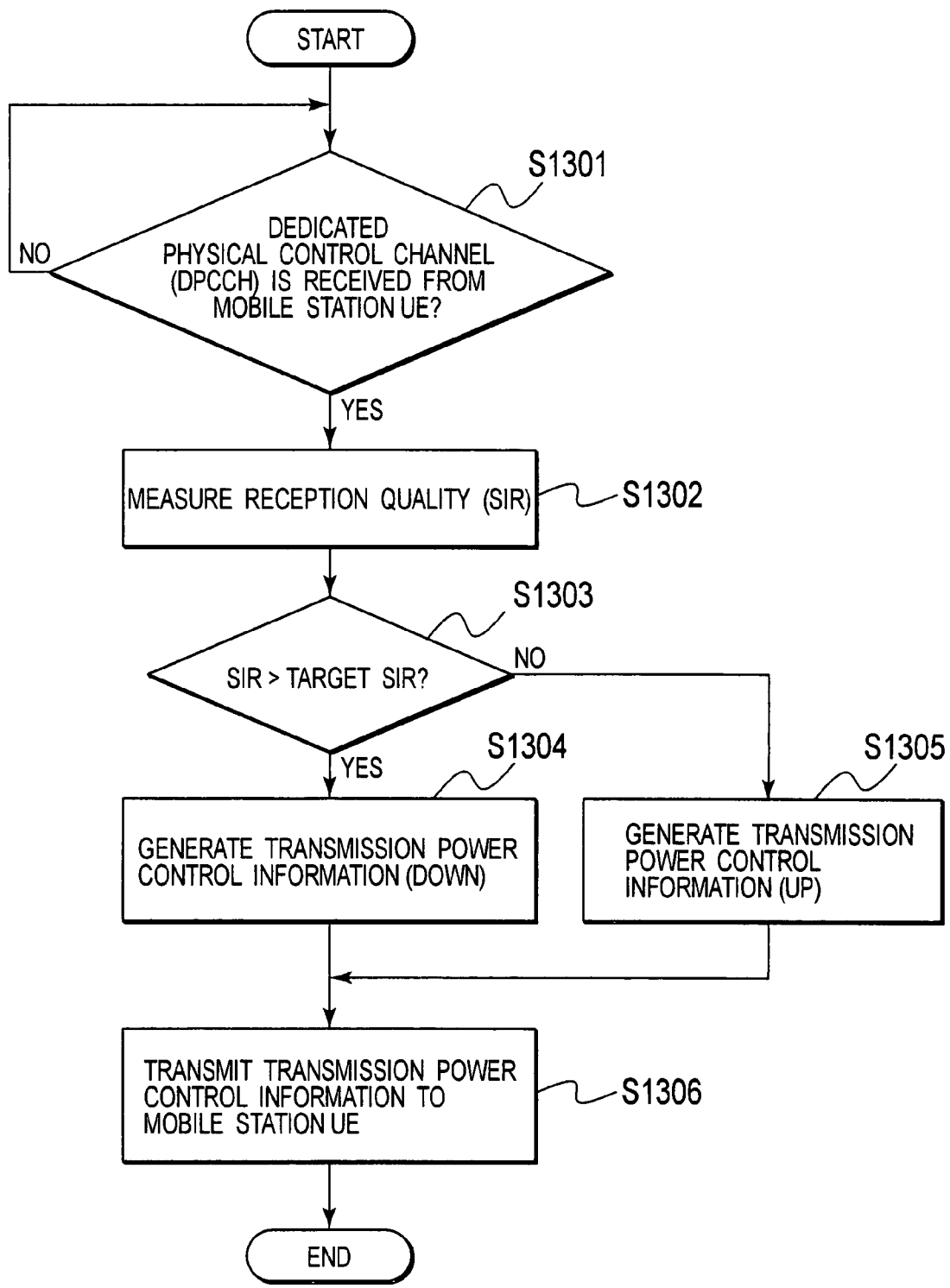
[FIG. 9] is a flowchart showing a closed-loop power control of the radio base station in the mobile communication system according to an embodiment of the present invention.

As shown in FIG. 9, when the base station Node B receives the enhanced dedicated physical data channel (E-DPDCH) transmitted from the mobile station UE, in step S1301, this operation proceeds to step S1302.

In step S1302, the base station Node B measures a reception quality (an SIR) of the dedicated physical control channel (DPCCH) received in step S1301.

In step S1303, the base station Node B judges whether or not the SIR measured in step S1302 is larger than the target SIR.

When the measured SIR is larger than the target SIR, the base station Node B generates, in step S1304, transmission power control information (down) ordering that a transmission power used when the mobile station UE transmits the dedicated physical control channel (DPCCH) be decreased.

When the measured SIR is not larger than the target SIR, the base station Node B generates, in step S1305, transmission power control information (up) ordering that the transmission power used when the mobile station UE transmits the dedicated physical control channel (E-DPCCH) be increased.

In step S1306, the base station Node B transmits the generated transmission power control information (down or up) to the mobile station UE as a TPC command.

Next, with reference to FIG. 10, operations in which the base station Node B forming the mobile communication system according to the first embodiment of the present invention performs an outer-loop power control will be described.

Figure 10:
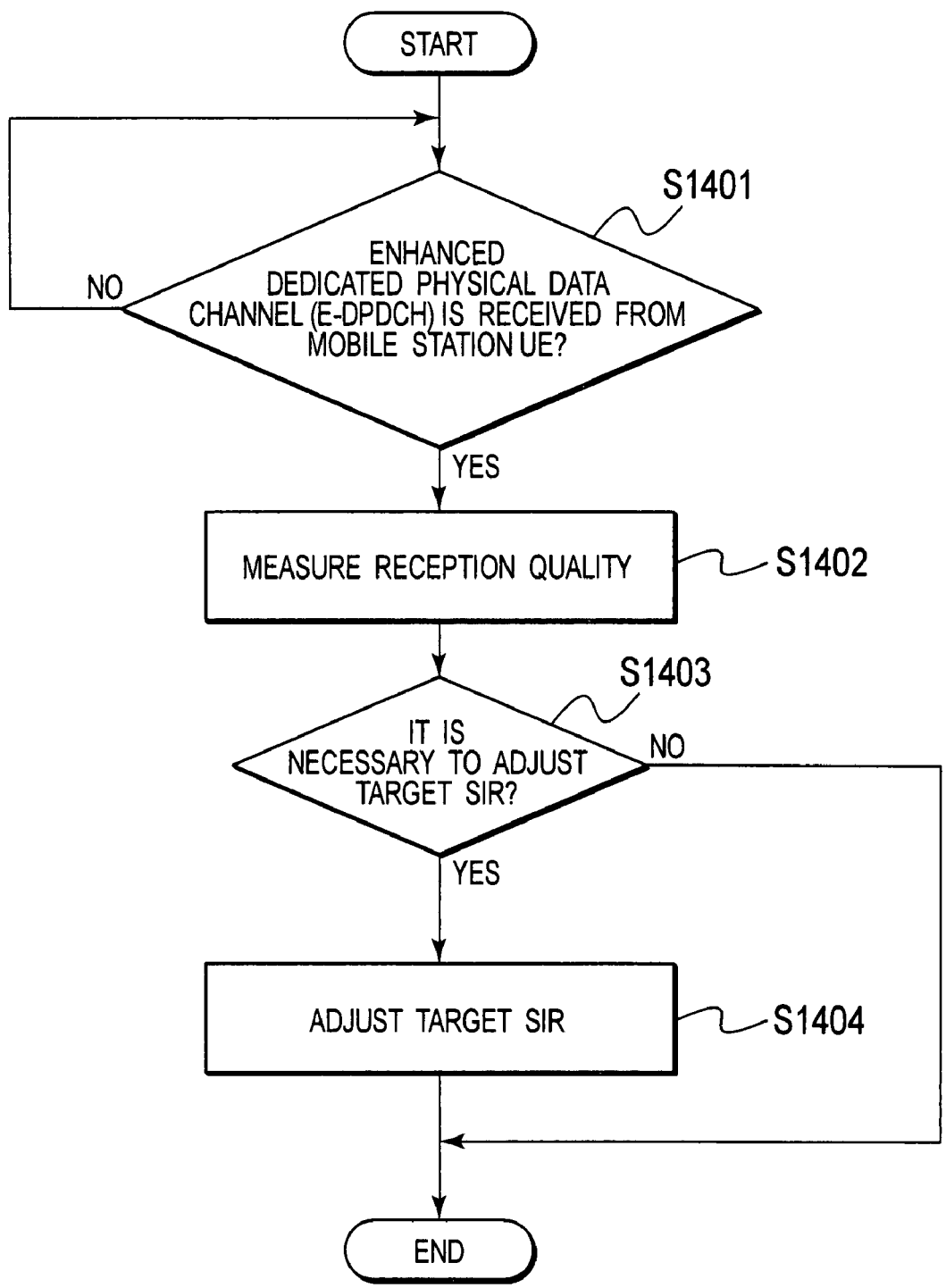
[FIG. 10] is a flowchart showing an outer-loop power control of the radio base station in the mobile communication system according to an embodiment of the present invention.

As shown in FIG. 10, when the base station Node B has received the enhanced dedicated physical data channel (E-DPDCH) transmitted from the mobile station UE, in step S1401, this operation proceeds to step S1402.

In step S1402, the base station Node B measures a reception quality of the enhanced dedicated physical data channel (E-DPDCH) received in step S1401. Here, the reception quality of the enhanced dedicated physical data channel (E-DPDCH) is a quality measured according to an error rate detected by an error detection code (for example, a CRC detection code or the like) and the like.

In step S1403, the base station Node B judges, according to the reception quality measured in step S1402, whether or not it is necessary to adjust the target SIR.

When it is necessary to adjust the target SIR, the base station Node B adjusts the target SIR in step S1404.

For example, when the reception quality measured in step S1402 is not satisfying a predetermined quality, the base station Node B increases the target SIR. When the target SIR has been increased, transmission power generation information (up) is generated by the above described closed-loop control, and thus the reception quality in the base station is improved, and a communication quality becomes stable.

Advantageous Effects of Mobile Communication System According To First Embodiment of the Present Invention According to the mobile communication system of the first embodiment of the present invention, in the mobile communication system to which the Enhanced Unlink is applied, the enhanced dedicated physical data channel (E-DPDCH) transmits all of transmission data blocks, and also is transmitted, even when there is no transmission data block that should be transmitted, in the form of a transmission format composed only of a control header and an error detection code. Accordingly, a reduction in equipment cost can be facilitated while stabilization of a communication quality is facilitated.

According to the mobile communication system of the first embodiment of the present invention, the mobile station UE constantly transmits an enhanced dedicated physical data channel (E-DPDCH) at a predetermined cycle, regardless of whether or not there is a transmission data block. Accordingly, even when there is no transmission data block transmitted from the mobile station UE, the radio base station Node B can facilitate stabilization of a communication quality by use of the enhanced dedicated physical data channel (E-DPDCH) without using the dedicated physical data channel (DPDCH), and thereby, a reduction in equipment cost used for receiving the dedicated physical data channel (DPDCH) can be facilitated.

The invention claimed is:

1. A mobile communication method for transmitting an Enhanced Dedicated Physical Data Channel (E-PDPCH) from a mobile station to a radio base station, comprising the steps of:
   transmitting, from the mobile station, a Dedicated Physical Control Channel (DPCCH) to which a retransmission control processing is not applied, at a first predetermined cycle, with a transmission power determined based on transmission power control information received from the radio base station;
   transmitting, from the mobile station, the Enhanced Dedicated Physical Data Channel containing a control header with user data, at a second predetermined cycle, with a transmission power having a predetermined offset relative to a transmission power of the Dedicated Physical Control Channel; wherein
   in the transmitting step, the mobile station transmits the Enhanced Dedicated Physical Data Channel containing the control header without the user data, when determined that no user data should be transmitted; and wherein
   in the transmitting step, the mobile station transmits the Enhanced Dedicated Physical Data Channel containing the control header and an error detection code without the user data, when determined that no user data should be transmitted.

2. The mobile communication method according to claim 1, wherein
   a retransmission-control is applied to the Enhanced Dedicated Physical Data Channel; and
   the mobile station does not retransmit the Enhanced Dedicated Physical Data Channel containing the control header without the user data.

3. The mobile communication method according to claim 1, further comprising the steps of:
   generating, by the radio base station, the transmission power control information for controlling the transmission power of the Dedicated Physical Control Channel, by a closed-loop power control based on a reception quality of the Dedicated Physical Control Channel and by an outer-loop power control based on a reception quality of the Enhanced Dedicated Physical Data Channel;
   transmitting the transmission power control information from the radio base station to the mobile station; and
   determining, by the mobile station, the transmission power of the Dedicated Physical Control Channel, based on the transmission power control information.

4. The mobile communication method according to claim 1, further comprising the steps of:
   measuring, by the radio base station, a reception quality of the Enhanced Dedicated Physical Data Channel according to an error rate detected by an error detection code;
   judging, by the radio base station, if it is necessary to adjust a target SIR based on the measured reception quality; and
   adjusting, by the radio base station, the target SIR based on the measured reception quality.

5. A mobile station which transmits an Enhanced Dedicated Physical Data Channel (E-PDPCH) to a radio base station, comprising:
   a Dedicated Physical Control Channel (DPCCH) transmitter unit configured to transmit the Dedicated Physical Control Channel to which retransmission control processing is not applied, at a first predetermined cycle, with a transmission power determined based on transmission power control information received from the radio base station;

the Enhanced Dedicated Physical Data Channel transmitter unit configured to transmit the Enhanced Dedicated Physical Data Channel containing a control header with user data, at a second predetermined cycle, with a transmission power having a predetermined offset relative to the transmission power of the Dedicated Physical Control Channel; and the Enhanced Dedicated Physical Data Channel transmitter unit configured to transmit the Enhanced Dedicated Physical Data Channel containing the control header and an error detection code without the user data when determined that no user data should be transmitted.

6. The mobile station according to claim 5, wherein a retransmission-control is applied to the Enhanced Dedicated Physical Data Channel; and the Enhanced Dedicated Physical Data Channel transmitter unit is configured not to retransmit the Enhanced Dedicated Physical Data Channel containing the control header without the user data.

7. The mobile station according to claim 5, further comprising:

a Transmission power controller unit configured to determine the transmission power of the Dedicated Physical Control Channel, based on the transmission power control information received from the base station.

* * * * *